(12) United States Patent
Thomas et al.

(10) Patent No.: US 7,377,676 B2
(45) Date of Patent: May 27, 2008

(54) METHODS AND APPARATUSES FOR ILLUMINATING WHEEL SURFACES

(75) Inventors: Mark Thomas, Cupertino, CA (US); Joel Osias, San Jose, CA (US)

(73) Assignee: Set Industries Corporation, Freemont, CA (US)

( * ) Notice: Subject to any disclaimer, the term of this patent is extended or adjusted under 35 U.S.C. 154(b) by 0 days.

(21) Appl. No.: 10/812,573

(22) Filed: Mar. 29, 2004

(65) Prior Publication Data

US 2005/0030755 A1 Feb. 10, 2005

Related U.S. Application Data

(60) Provisional application No. 60/493,542, filed on Aug. 8, 2003.

(51) Int. Cl.
*B60Q 1/26* (2006.01)
(52) U.S. Cl. .................. 362/500; 362/473; 362/511
(58) Field of Classification Search ........... 362/473, 362/500, 511, 545; 301/37.101, 37.108; 40/587
See application file for complete search history.

(56) References Cited

U.S. PATENT DOCUMENTS

| | | | |
|---|---|---|---|
| 1,643,593 A | | 9/1927 | Styer et al. |
| 1,740,588 A | * | 12/1929 | Hamilton ............ 362/516 |
| 2,177,467 A | * | 10/1939 | Sunderhauf ............ 40/571 |
| 2,526,548 A | * | 10/1950 | Franklin ............ 362/500 |
| 3,699,367 A | | 10/1972 | Thomas |
| 3,760,351 A | | 9/1973 | Thomas |
| 4,229,728 A | | 10/1980 | Tremba |
| 4,405,872 A | | 9/1983 | Thomas |
| 4,429,232 A | | 1/1984 | Thomas et al. |
| 4,430,692 A | * | 2/1984 | Papadakis ............ 362/500 |
| 4,504,761 A | | 3/1985 | Triplett |
| 4,539,496 A | | 9/1985 | Thomas et al. |
| 4,761,577 A | | 8/1988 | Thomas et al. |
| 4,775,919 A | | 10/1988 | Pearsall et al. |
| 5,016,144 A | | 5/1991 | DiMaggio |
| 5,193,777 A | * | 3/1993 | Faulstich ............ 248/441.1 |

(Continued)

FOREIGN PATENT DOCUMENTS

DE    19922570 A1    11/2000

(Continued)

*Primary Examiner*—Stephen F. Husar
*Assistant Examiner*—Peggy A. Neils
(74) *Attorney, Agent, or Firm*—Blakely Sokoloff Taylor & Zafman

(57) ABSTRACT

Embodiments of the invention provide methods and apparatuses for illuminating the surface of a wheel with one or more light source assemblies positioned within the rotating reference frame of the wheel. The amount of light from the light source assemblies reflected from the wheel surface is greater than the amount of light, from the light source assemblies, that is directed away from the wheel surface. The light source assemblies may include a shield to reduce the amount of light that is directed away from the wheel surface. The light source assemblies may include various light-directing devices to direct light toward the wheel surface and to help reduce the amount of light from the light source assemblies, that is directed away from the wheel surface. The surface of the wheel may be modified to help direct the light, reflected from the wheel surface, to a specified observation region.

22 Claims, 9 Drawing Sheets

U.S. PATENT DOCUMENTS

| | | | |
|---|---|---|---|
| 5,548,274 A | 8/1996 | Anderson et al. | |
| 5,558,426 A | 9/1996 | Cabanatan et al. | |
| 5,650,681 A | 7/1997 | DeLerno | |
| 5,800,035 A * | 9/1998 | Aichele | 362/31 |
| 5,934,882 A | 8/1999 | Olney et al. | |
| 6,016,101 A * | 1/2000 | Brown | 340/432 |
| 6,030,106 A | 2/2000 | Johnson | |
| 6,059,431 A * | 5/2000 | Ellis, Jr. | 362/500 |
| 6,220,733 B1 * | 4/2001 | Gordon | 362/500 |
| 6,291,901 B1 | 9/2001 | Cefo | |
| 6,530,683 B1 * | 3/2003 | Ohkohdo et al. | 362/511 |
| 6,565,243 B1 * | 5/2003 | Cheung | 362/500 |
| 6,612,726 B1 | 9/2003 | Gloodt et al. | |
| 6,641,041 B2 | 11/2003 | Olds et al. | |
| 6,776,458 B1 * | 8/2004 | Wang | 301/37.105 |
| 6,789,928 B2 * | 9/2004 | Khan | 362/500 |
| 6,809,426 B2 | 10/2004 | Naar et al. | |
| 6,817,743 B2 | 11/2004 | Sharper | |
| 6,822,357 B2 * | 11/2004 | Hung | 310/75 C |
| 7,150,549 B2 * | 12/2006 | Olds et al. | 362/500 |
| 2002/0136020 A1 * | 9/2002 | Hung | 362/500 |
| 2003/0169595 A1 * | 9/2003 | Lee | 362/500 |
| 2003/0202356 A1 * | 10/2003 | Hung | 362/500 |
| 2003/0223243 A1 * | 12/2003 | Miller | 362/487 |
| 2004/0037088 A1 * | 2/2004 | English et al. | 362/545 |
| 2005/0030755 A1 | 2/2005 | Thomas et al. | |
| 2005/0099820 A1 | 5/2005 | Cooper | |

FOREIGN PATENT DOCUMENTS

| | | |
|---|---|---|
| DE | 10055882 A1 | 5/2002 |
| FR | 2407599 A1 | 6/1979 |
| GB | 2307044 A | 5/1997 |
| JP | 2001258234 A | 9/2001 |
| RU | 2248084 C2 | 3/2005 |

* cited by examiner

SECTION A-A

SECTION (A-A)

(SECTION A-A)

(SECTION A-A)

(SECTION A-A)

METHODS AND APPARATUSES FOR ILLUMINATING WHEEL SURFACES

CLAIM OF PRIORITY

This application is related to, and hereby claims the benefit of provisional application No. 60/493,542, which was filed on Aug. 8, 2003, which is incorporated by reference.

FIELD

Embodiments of the invention relate, generally, to the field of wheel ornamentation and, more specifically, to methods and apparatuses to provide wheel illumination.

BACKGROUND

For many years there has been an interest in wheel ornamentation and, in particular, wheel lighting for automobiles, motorcycles, bicycles, and other wheeled vehicles.

The motivation for wheel lighting is a combination of aesthetic and safety enhancement. As early as 1926, there is patent lore on those seeking to achieve lighting of the wheel, for example, Styer, U.S. Pat. No. 1,643,593. Over a hundred patents have been filed in regard to the quest to achieve the general goal of wheel lighting.

Prior art wheel lighting has been focused, for the most part, on the placement of lights on or near the wheel for ornamentation or safety. In such cases, the lights are in clear view of the observer and the primary light that reaches the observer is direct light from the source, not reflected light off the wheel surface to the observer.

A wheel light that illuminates the surface of the wheel can provide an observer with an aesthetically pleasing display of the wheel. Prior art wheel lighting schemes have achieved illumination of the wheel surface to obtain such an effect by reflecting light off the wheel surface. For example, Cabanatan, U.S. Pat. No. 5,558,426, teaches a scheme that employs a rigid arm mounted to the frame of an automobile. At the end of the rigid arm, a light bulb is mounted in an electrical socket, which in turn, is electrically connected to the power source of the automobile. One prior art scheme employs fiber optics to direct light, generated on the frame of the vehicle, to the wheel surface.

Such schemes are costly and difficult to implement due to the mounting required and the number of distinct automobile frames that must be accommodated.

Prior art wheel illumination schemes avoid positioning the lights on the wheel due to a number of concerns, including robustness and space availability. However, mounting the lights on the frame of a vehicle is less elegant and not as aesthetically pleasing. Moreover, the frame-mounted wheel illumination device increases the overall width of the vehicle, thereby increasing the required clearance and likelihood of damage.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Figure 1:
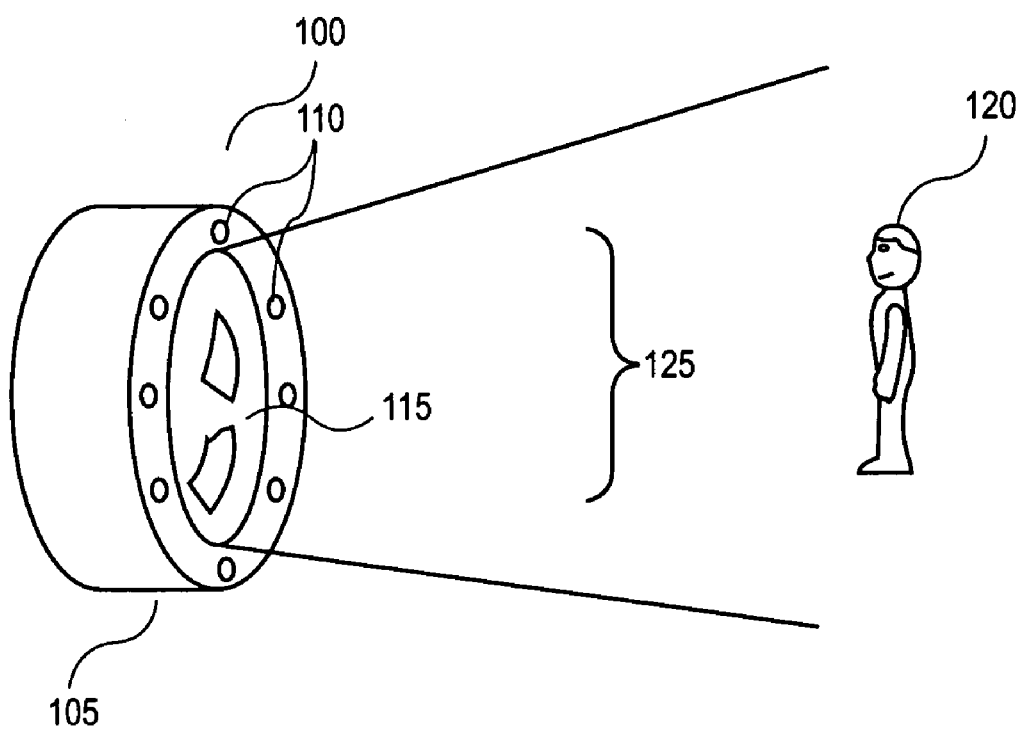
FIG. 1 illustrates a system for wheel illumination in accordance with one embodiment of the invention.

Embodiments of the invention provide methods and apparatuses for illuminating the surface of a wheel. For one embodiment, one or more light sources are positioned within the rotating reference frame of the wheel. Some of the light from the one or more light sources is incident upon the wheel surface and is reflected from the wheel surface. The amount of such reflected light is greater than the amount of light, from the light source, that is directed away from the wheel surface. For one embodiment, each light source is a part of a light source assembly that may include elements that help reduce the amount of light, from the light source assemblies, that is directed away from the wheel surface. For such embodiments, the amount of light reflected from the wheel surface is greater than the amount of light, from the light source assemblies, that is directed outward from the wheel surface. That is, the amount of light from the light sources that is directed past an observation plane located beyond the light source assemblies, is less than the amount of light, from the light source assemblies, reflected from the surface of the wheel.

Additionally, or alternatively, for other embodiments, various light-directing devices are employed to direct light from the light sources toward the wheel surface and to help reduce the amount of light, from the light sources, directed away from the wheel surface that is incident in a specified observation region. For still other embodiments, the surface of the wheel may be modified to help direct the light, reflected from the wheel surface, in such a way as to increase the appearance of wheel illumination.

It is an intended advantage of one embodiment of the invention to provide a light-producing device which, when positioned in a specified location within the rotating reference frame of a wheel, directs a sufficient amount of light to the wheel surface, such that the amount of light reflected from the wheel surface is greater than an amount of light, if any, directed from the light-producing device, away from the wheel surface.

It is another intended advantage of one embodiment of the invention to control the light directed from the light sources and the light reflected from the wheel surface, so as to achieve an essentially uniform and aesthetically pleasing illumination of the wheel.

It is another intended advantage of one embodiment of the invention to control the light directed from the light sources and the light reflected from the wheel surface, so that the amount of light reflected from the surface of the wheel that is incident within a specified observation region, is greater than the amount of light directed from the light sources that is incident within the specified observation region.

It is another intended advantage of one embodiment of the invention to provide a number of structures, that may be used alone or in conjunction with one another, to attach or position light sources in the rotating reference frame of the wheel. Such structures include, but are not limited to, an illuminator ring, a wheel center cap, and a crossbeam structure, as well as incorporation within the wheel itself, and discrete lighting assemblies. Embodiments illustrating exemplary design and use of such structures are discussed below.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

System

A system, in accordance with one embodiment of the invention, includes one or more light source assemblies. As used herein, the term "light source assembly" includes a light source, which may be any conventional light source, including light-emitting diodes (LEDs), filament-based, gas-based, laser, or combinations thereof, and a light source in combination with other elements for directing or shielding the light from the light source.

In accordance with one embodiment, one or more light source assemblies are positioned within the rotating reference frame of a wheel. As used herein, the term "rotating reference frame of a wheel" includes any surfaces that are rotating at the same rotational frequency as the wheel and around the same axis as the wheel. The rotating reference frame, therefore, includes the wheel, the tire, the lugs, the lug nuts, the hub, the valve stem, the drum, the hat, the disc, etc. The rotating reference frame further includes devices and surfaces that are attached to the wheel, for example, for aesthetic or protective purposes. Such devices may include, for example, hubcaps, center cap wings, or devices, such as spinners, with bearing floating surfaces that allow some portion of the device to rotate at a different rotational frequency than the wheel or in the extreme case not rotate. Such surfaces may include, for example, protective coatings or decals applied to any portion of the wheel surface, as well as other wheel surface alterations.

In accordance with one embodiment, the light sources are positioned such that a portion of the light from the one or more light sources is incident upon the surface of the wheel (wheel surface) and is reflected from the wheel surface. As used herein, the term "wheel surface" includes the actual surface of the wheel, as well as any protective or artistic surfaces applied to the surface of the wheel. The amount of such reflected light is greater than the amount of light from the light source that is directed away from the wheel surface. Thus, wheel illumination is accomplished with light sources positioned within the rotating reference frame of the wheel.

FIG. 1 illustrates a system for wheel illumination in accordance with one embodiment of the invention. System 100, shown in FIG. 1, includes a wheel 105 having a number of light source assemblies 110 positioned thereon. The light source assemblies 110 may consist only of light sources for one embodiment, or may consist of light sources in conjunction with an apparatus for shielding or directing light for various alternative embodiments. Light source assemblies 110 are positioned on the wheel such that light from the light source assemblies 110 is incident on the wheel surface 115 and is reflected therefrom. The light source assemblies may be positioned anywhere within the rotating reference frame of the wheel 105, including the wheel rim, the rim flange, the wheel center cap, the disk, the hat, and the spoke, none of which are referenced.

In accordance with one embodiment of the invention, the light reflected from the wheel surface 115 is greater than the light directed from the light source assemblies 110 away from the wheel 105. Thus, wheel illumination is effected for an observer 120 in an observation region 125.

Positioning of the light source assemblies within the rotating reference frame of the wheel and providing for illumination of the wheel surface, as described above, may be effected in various ways in accordance with alternative embodiments of the invention.

The following exemplary embodiments of the invention address one or both of these considerations. It will be apparent to one skilled in the art that aspects of each of the disclosed embodiments may be incorporated to form alternative embodiments.

Wheel Illuminator Ring

Figure 2:
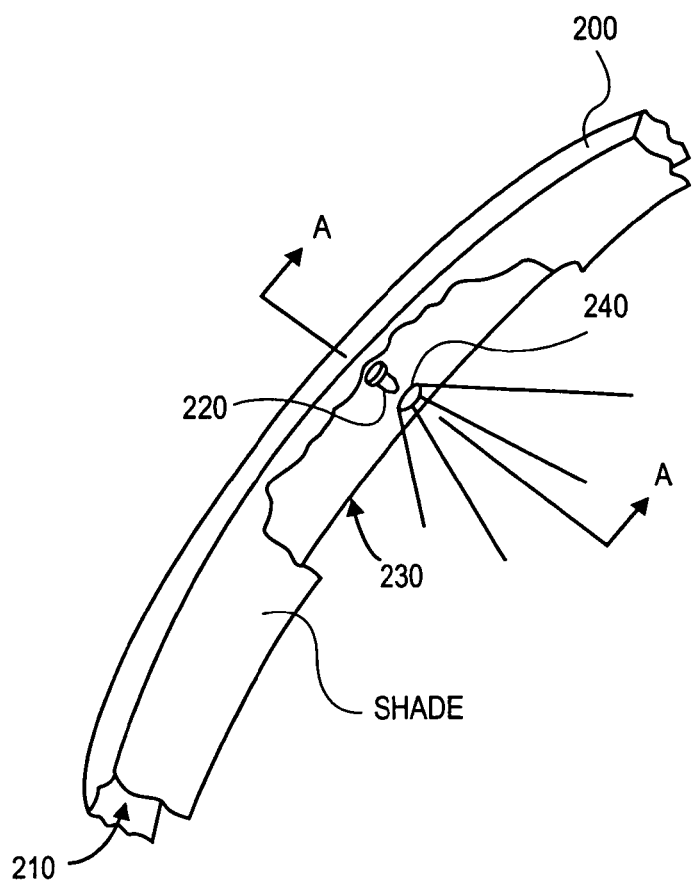
FIG. 2 illustrates a portion of a ring in which light sources are positioned in accordance with one embodiment of the invention.

For one embodiment, the light source assemblies are positioned on or within a ring structure. The ring structure may be attached to the wheel at various locations including the wheel rim, rim flange, or the wheel hub for various alternative embodiments. FIG. 2 illustrates a portion of a ring in which light source assemblies are positioned in accordance with one embodiment of the invention. Ring portion 200, shown in FIG. 2, has an enclosed area 210 in which one or more light sources 220 are positioned. In general, light from the light source assemblies is allowed to escape from the ring through apertures, such as aperture 230. As shown in FIG. 2, the aperture 230 through which the light projects may be located on the ring's inside diameter surface, not shown. In general, m light sources may be coupled through n apertures. For one embodiment of the invention, the light source assemblies may include, in addition to light sources 220, optical elements 240. Optical elements 240, which may include a lens, a reflector, a prism, and combinations thereof, as well as other optical elements, may be employed to direct the light from the aperture to the surfaces of the wheel and minimize the emission of light directly to the observer.

Figure 2A:
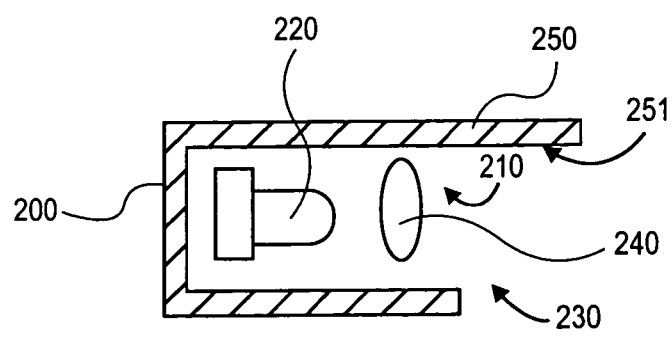
FIG. 2A illustrates a cross-sectional perspective of a ring portion showing a flange that extends beyond the transparent member to act as a shade in accordance with one embodiment of the invention.

Further screening of direct light emission is accomplished by providing for the inclusion of shading mechanisms for the light source assemblies. FIG. 2A illustrates a cross-sectional perspective of the ring portion 200 showing a flange that extends beyond the transparent member to act as a shade in accordance with one embodiment of the invention. Shade portion 250 reduces the light from light source assemblies that is directed away from the wheel. For one embodiment, the inner surface 251 of the shade portion 250 is reflective, thus, not only reducing the light directed away from the wheel, from the light source assemblies, but also directing the light back toward the wheel surface.

Figure 3:
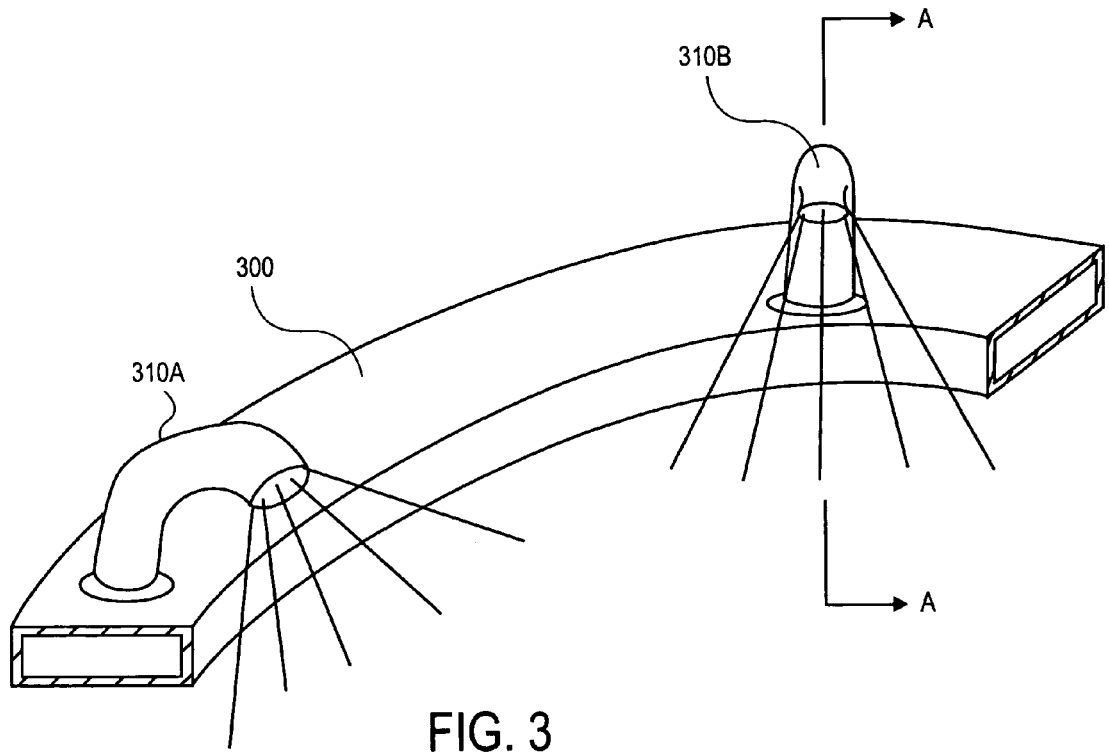
FIG. 3 illustrates a portion of a light projector carrier ring in accordance with one embodiment of the invention.

For one embodiment, the light source assemblies may include a light projector that may be used to guide the light from the light source assemblies to the wheel surface. FIG. 3 illustrates a portion of a light projector carrier ring in accordance with one embodiment of the invention. The light projector carrier ring portion 300, shown in FIG. 3, includes light projectors 310a and 310b, shown from different perspectives. In general, m light sources may be coupled to n light projectors.

Figure 3A:
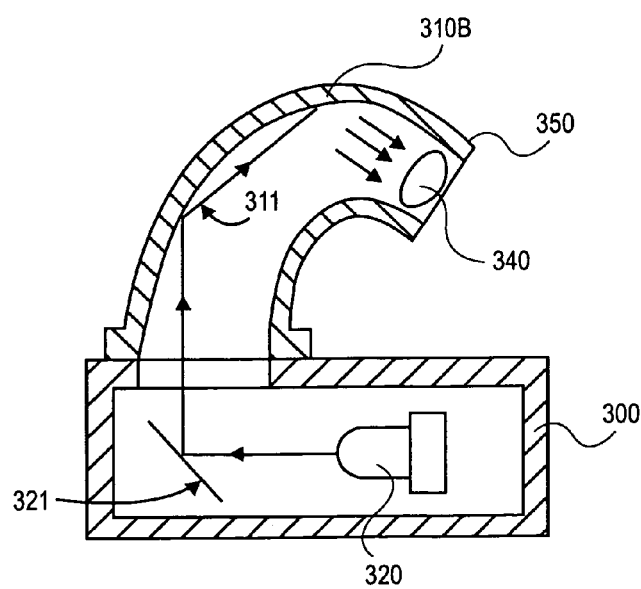
FIG. 3A illustrates a cross-sectional perspective of a light projector carrier ring portion in accordance with one embodiment of the invention in which the light projector does not include a light source.

FIG. 3A illustrates a cross-sectional perspective of the light projector carrier ring (carrier ring) portion 300, in accordance with one embodiment of the invention, in which the light projector 310b does not include a light source. As shown in FIG. 3A, the light source 320 is included in the carrier ring 300. Light from the light source 320 is directed by reflective element 321 through light projector 310, which has an inner surface 311 that functions as a waveguide to direct the light out of the light projector toward the wheel surface. A portion 350 of inner surface 311 acts as a shade, as discussed above. In accordance with one embodiment, an optical element 340 may be employed to direct the light from the light projector to the surface of the wheel. The optical element 340 is placed a sufficient distance (e.g., a focal length or more) from the waveguide so that a wave front is formed to effect direction of the light to the surface of the wheel. In an alternative embodiment, the end of the light projector may be flared to address this concern.

Figure 3B:
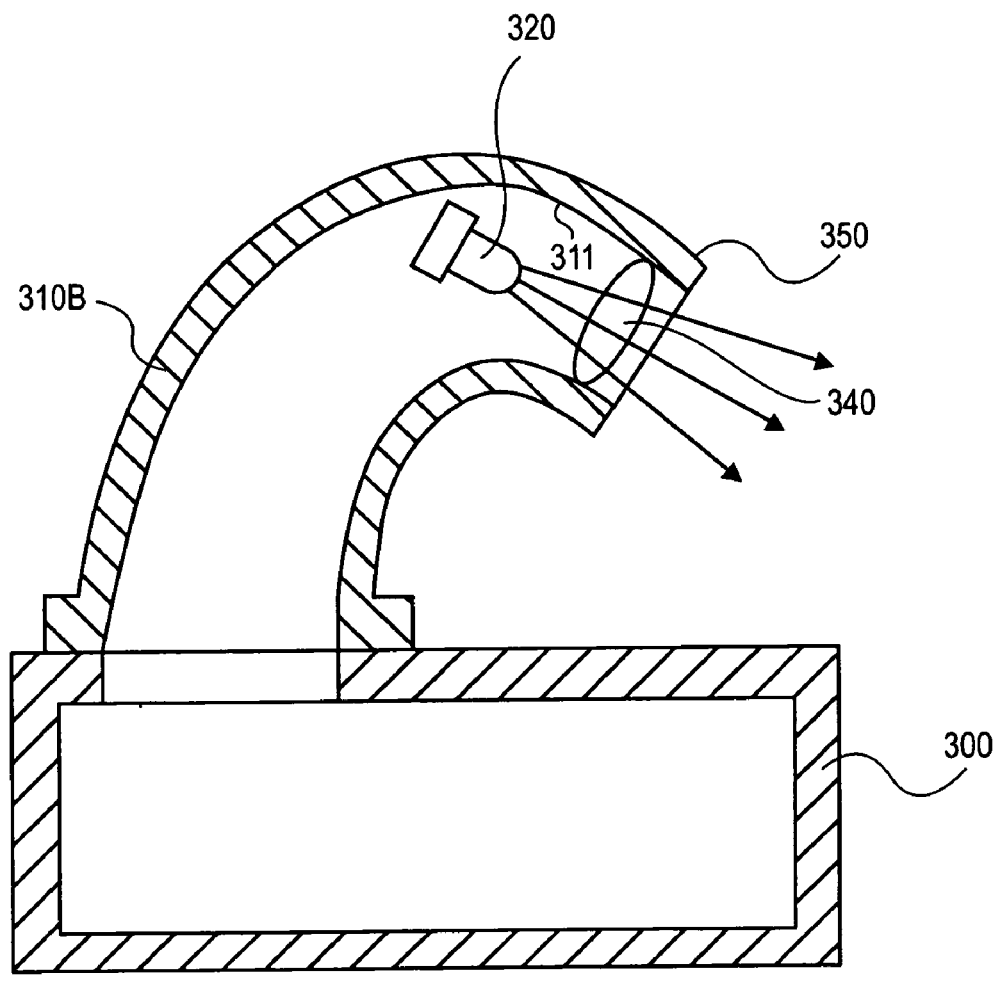
FIG. 3B illustrates a cross-sectional perspective of a carrier ring portion in accordance with one embodiment of the invention in which the light source is inside the light projector.

FIG. 3B illustrates a cross-sectional perspective of the carrier ring portion 300, in accordance with one embodiment of the invention, in which the light source 320 is inside the light projector 310b. As shown in FIG. 3B, the light source 320 is included in the light projector 310b. Light from the light source 320 is transmitted out of the light projector toward the wheel surface. A portion 350 of the light projector acts as a shade, as discussed above. In accordance with one embodiment, an optical element 340, appropriately positioned within the light projector, may be employed to direct the light from the light projector to the surface of the wheel.

For one embodiment, the light source assemblies may include one or more waveguides to which the light from the light sources is coupled. The waveguides may be used to direct the light to single or multiple emission points (apertures). The waveguides may be oriented such that they run along the length of the ring. The light that is introduced into the waveguide propagates down the length of the waveguide. The waveguide may be constructed with a continuous aperture or a number of discrete apertures that allow light to escape along the inside diameter of the waveguide, continuously or discretely, respectively, thus illuminating the surface of the wheel. The ends of each waveguide may be reflective to allow multiple passes of the light before the light exits the waveguide through an aperture. The waveguide apertures may be created through various means in accordance with alternative embodiments of the invention. For example, altering the waveguide interface boundary, in shape or composition, may create an aperture. For one embodiment of the invention, this may be effected by attaching a micro-optic prism array sheet collimator (MOSC) layer. For an alternative embodiment of the invention, this may be effected by altering the direction of propagation of the light within a waveguide.

Wheel Center Cap

Figure 4:
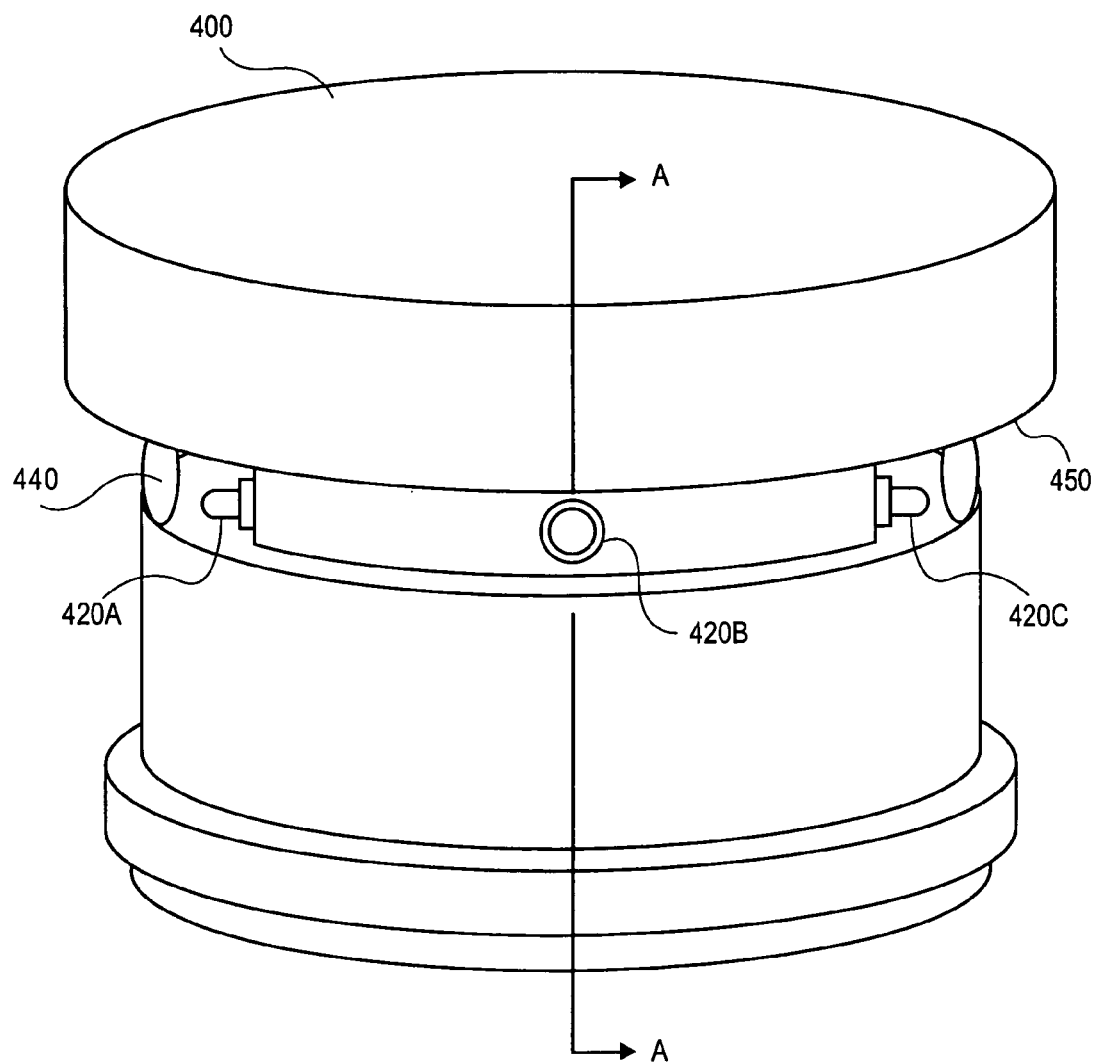
FIG. 4 illustrates a wheel center cap having light sources positioned within in accordance with one embodiment of the invention.

For one embodiment of the invention, the light source assemblies may be positioned within a wheel center cap. In general, the light from m light sources may be transmitted to the surface of the wheel through n of apertures. FIG. 4 illustrates a wheel center cap having light source assemblies positioned within, in accordance with one embodiment of the invention. Wheel center cap 400, shown in FIG. 4, has positioned therein a number of light sources 420a-420c. The light from light sources 420a-420c may be directed to the wheel surface by a corresponding optical element 440. Wheel center cap 400 also includes a shade 450 to reduce light from the light source assemblies directed away from the wheel. Shade 450 may also be reflective to direct light toward the surface of the wheel.

Figure 4A:
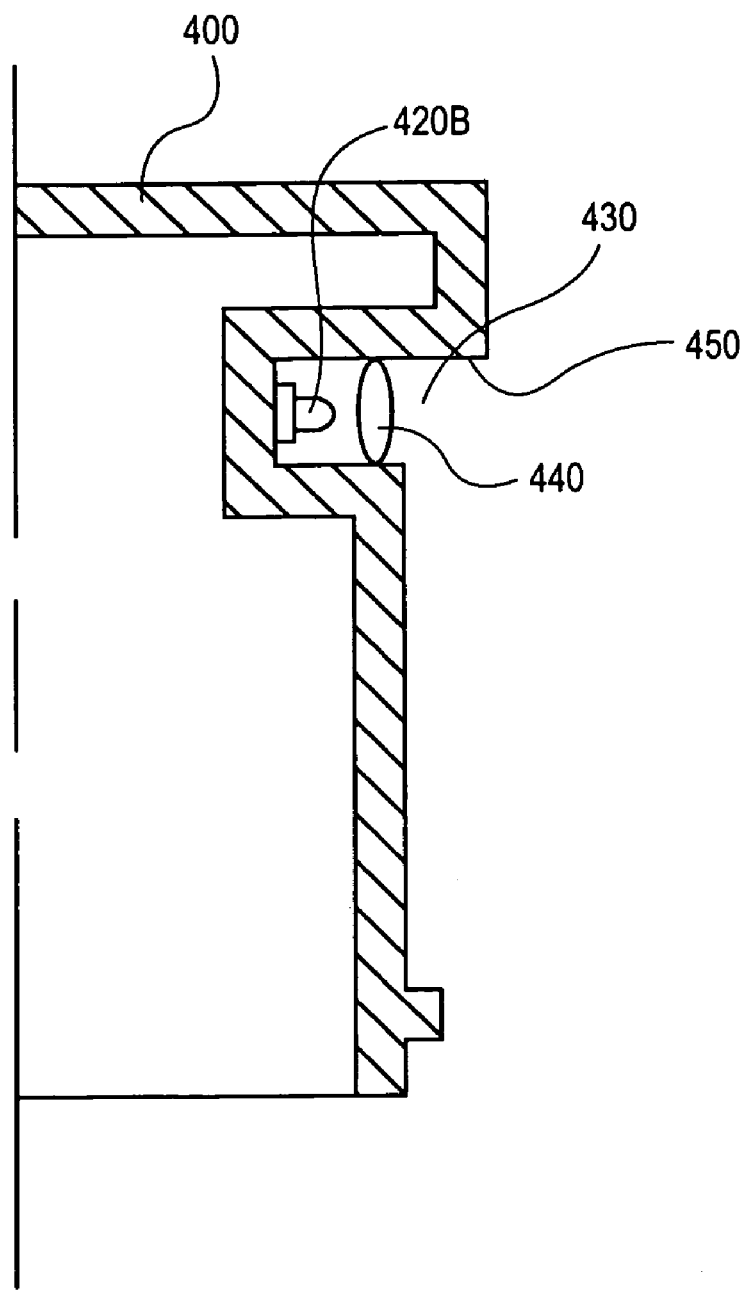
FIG. 4A illustrates a cross-sectional perspective of the wheel center cap in accordance with one embodiment of the invention.

FIG. 4A illustrates a cross-sectional perspective of the wheel center cap 400 in accordance with one embodiment of the invention. As shown in FIG. 4A, the light source 420b is directed through one aperture 430. The light may be directed through the use of optical element 440. The light may also be shaded and/or reflected by shade 450, as discussed above.

Figure 4B:
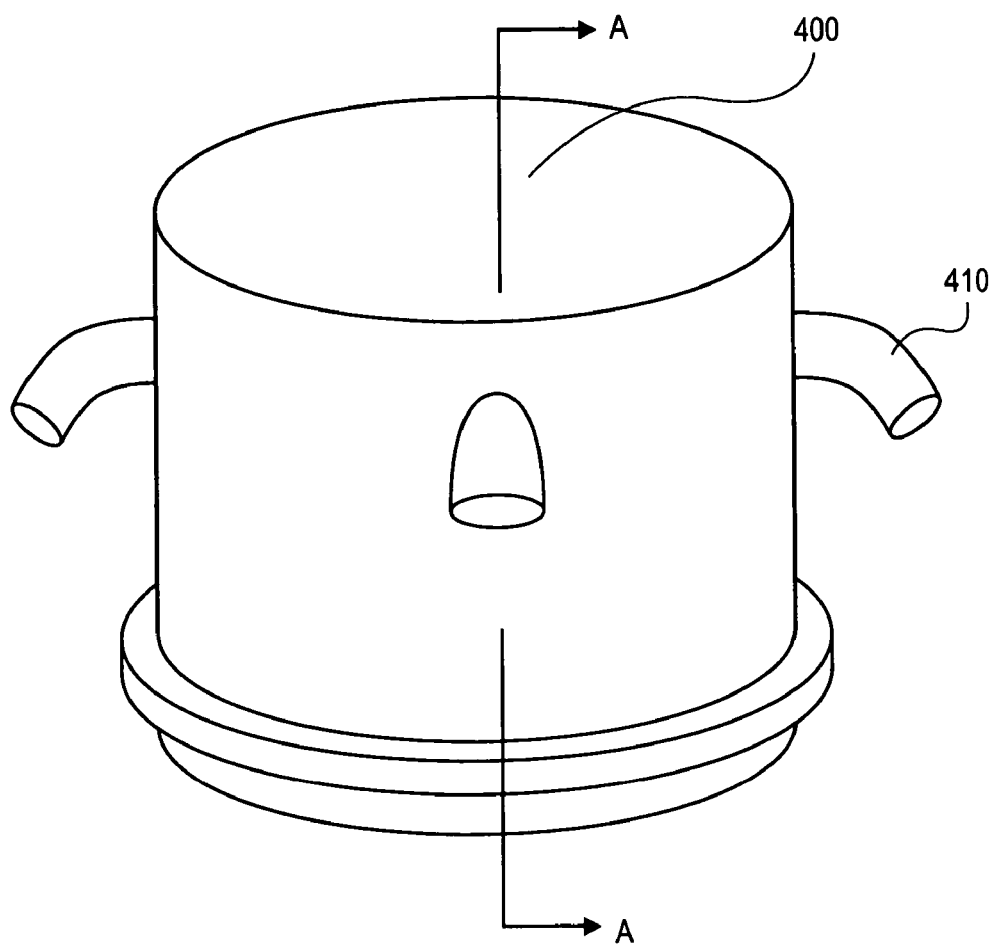
FIG. 4B illustrates a wheel center cap employing light projectors to direct light to the wheel surface in accordance with one embodiment of the invention.

FIG. 4B illustrates a wheel center cap employing light projectors to direct light to the wheel surface in accordance with one embodiment of the invention. As shown in FIG. 4B, wheel center cap 400 includes a number of light projectors 410. As discussed above, in reference to FIG. 3, the light source may be inside the light projector and may include optical elements to direct the light to the surface of the wheel.

In an alternative embodiment, the light source assemblies are positioned on or in the wheel center cap and include a single or multiple waveguides, as discussed above. The waveguides may be used to direct the light to single or multiple apertures.

Incorporation within the Wheel

Figure 5:
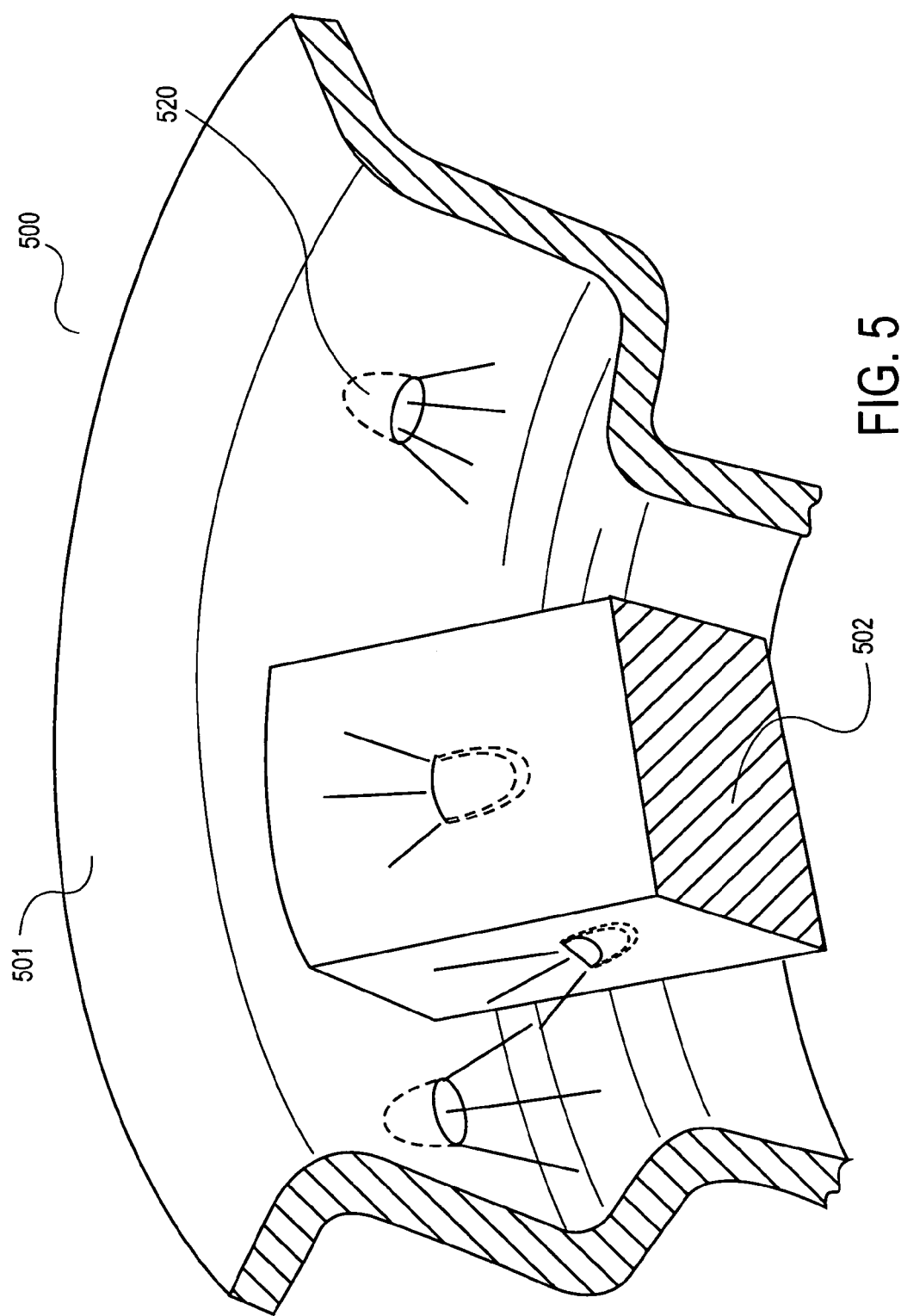
FIG. 5 illustrates a portion of a wheel having light sources positioned within in accordance with one embodiment of the invention.

For one embodiment of the invention, the light source assemblies are incorporated within the wheel. That is, the wheel itself may house the light source assemblies and provide for shading and optical waveguides for directing the light to the wheel surface. FIG. 5 illustrates a portion of a wheel having light source assemblies positioned within, in accordance with one embodiment of the invention. Wheel portion 500, shown in FIG. 5, has positioned thereon, a number of light sources 520. The light sources 520 are housed within the wheel and may be housed in the wheel rim 501, the spokes 502, or in other portions of the wheel. If the wheel is designed to house a wheel illumination device, in accordance with one embodiment of the invention, the wheel surface may be designed so as to help increase the amount of light that is reflected from the surface of the wheel into a specified observation region.

For alternative embodiments, the wheel has compartments formed therein, into which illumination modules are positioned. For one embodiment, the illumination modules contain the light source assemblies and power sources and can be readily attached to the wheel. For one embodiment, the illumination modules may be detachable and replaceable as well.

Cross Beam Structure

In accordance with one embodiment, the light source assemblies are located on a crossbeam structure having an open-ended construction whose lengthwise dimensions exceed any cross-sectional dimensions. In general, the light is allowed to escape from the crossbeam structure through an aperture or a number of apertures. For various embodiments of the invention, the light source assemblies may include optical elements to direct the light from the aperture to the surface of the wheel and minimize the emission of light directly to the observer. The light source assemblies may also include shading or reflector mechanisms to further screen out direct light, as discussed above.

Figure 6:
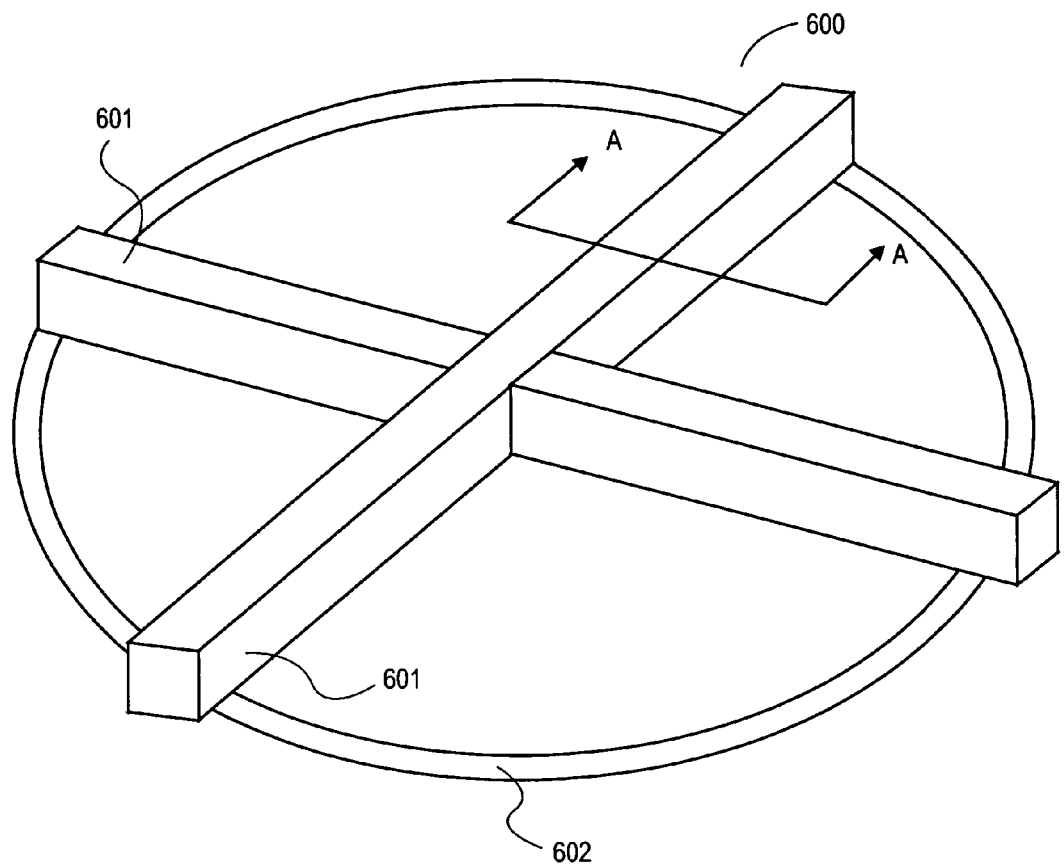
FIG. 6 illustrates a crossbeam structure in which light sources are positioned in accordance with one embodiment of the invention.

FIG. 6 illustrates a crossbeam structure in which light source assemblies are positioned in accordance with one embodiment of the invention. Crossbeam structure 600, shown in FIG. 6, includes one or more members 601 positioned across the wheel surface. As shown in FIG. 6, the members 601 may extend across a diameter of the rim 602 circumference.

Figure 6A:
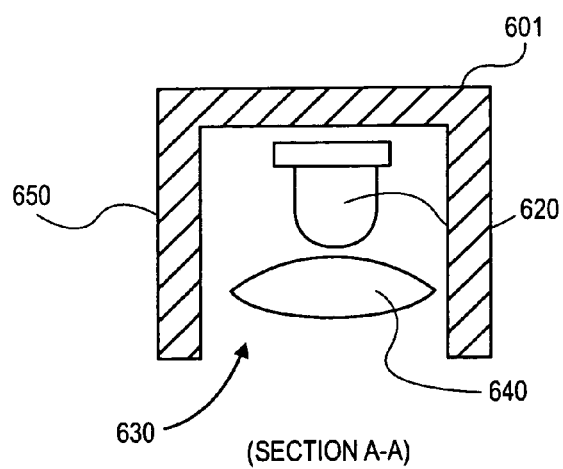
FIG. 6A illustrates a cross-sectional perspective of a crossbeam structure member in accordance with one embodiment of the invention.

FIG. 6A illustrates a cross-sectional perspective of a crossbeam structure member 601 in accordance with one embodiment of the invention. As shown in FIG. 6A, light source 620 is positioned within member 601. Light from the light source 620 is directed through aperture 630. The light may be directed through use of optical element 640. The light may also be shaded and/or reflected by shade 650, as discussed above.

In accordance with one embodiment of the invention, the light source assemblies positioned on members 601 may include light projectors to direct light from the light sources to the surface of the wheel. As discussed above, in reference to FIG. 3, the light source may be inside the light projector and may include optical elements to direct the light to the surface of the wheel. In an alternative embodiment, the light source assemblies are positioned on or in the crossbeam structure and include a single or multiple waveguides, as discussed above.

Discrete Lighting Assemblies

Various embodiments have been described in terms of structures in which the light source assemblies are contained. For one embodiment, the light source assemblies are not attached to a common structural body (other than the wheel, once positioned thereon). That is, the light source assemblies are individual assemblies that may be discretely attached to the wheel. The light source assemblies may contain a single light source with a single light port or, in general, n light sources and m light ports. The light source assemblies may be attached in various positions within the rotating reference frame of the wheel including the wheel surface, the rim or rim flange, the center cap, or the spokes. The light source assemblies may be attached through a variety of means including clips or adhesives. For various embodiments, each light source assembly may include, in addition to one or more light sources, a shade (or shade/reflector) mechanism for blocking direct optical radiation from reaching the eye of the observer, as well as an optical apparatus for directing the light to the wheel surface.

Wheel Surface Modification

For one embodiment, the wheel surface is modified to increase the amount of light reflected therefrom. Some of the reflected light from some typical wheel surfaces (chrome) may have an angle incidence that results in an angle of reflection that is not visible to an observer in a specified observation region. In such cases, it may be possible to modify the wheel surface. For one embodiment, modification of the wheel surface causes more of the light, reflected therefrom, to be directed to a specified observation region. Such modification can be permanent and may be effected by, for example, altering the surface finish of the wheel by abrasive techniques such as machining, bead blasting, or chemically etching or altering the surface finish of the wheel by adding a chemical coating such paint or plating.

Applied Surface Embodiments

As discussed above, embodiments of the invention illuminate devices such as hubcaps, spinners, or center cap wings, that are attached to the wheel within the rotating reference frame. For one embodiment of the invention, the lighting elements may be contained within the hubcap (or other structural element, covering some or all of the wheel surface). Such structural elements may be mounted to the wheel in a number of ways including the typical method (for hubcaps) of mounting using a set of clips securing the hubcap to the rim flange of the wheel.

As discussed above, in reference to various alternative embodiments of the invention, the lighting elements contained within an applied structural surface may be shielded from direct view. Moreover, the light from the lighting elements may be directed to reflect from various portions of the applied structural surfaces and/or wheel surfaces. For alternative embodiments, the applied structural surfaces may contain other elements of the wheel illuminating system (e.g., power supply and control subsystems).

For alternative embodiments of the invention, applied surfaces include, for example, protective coatings or decals applied to any portion of the wheel surface, as well as other wheel surface alterations. Such applied surfaces may cover some or all of the wheel surface and may be applied to specific portions of the wheel surface to enhance illumination. Again, the light from the lighting elements may be directed to reflect from various portions of the applied surfaces and/or wheel surfaces.

General Matters

Embodiments of the invention provide methods and apparatuses for illuminating the surface of a wheel. Although described in terms of embodiments related to automobile wheels, it will be apparent to those skilled in the art that embodiments of the invention have application to other wheels. This may include, for example, the wheels of any motorized and non-motorized vehicles, including toy vehicles, as well as unicycles, bicycles, tricycles, skateboards, roller skates, roller blades, and wagons.

Various embodiments of the invention provide a number of advantages not specifically mentioned in reference to embodiments described above. One embodiment of the invention achieves illumination of the wheel without being so distracting as to cause it to be a hazard to motorists and/or pedestrians. Various embodiments may contain features that promote such illumination. For example, one embodiment provides limited apparent motion of the lighting patterns and substantially uniform illumination when moving (i.e. minimal "hot spots" when the wheel is moving that would otherwise appear as a rotating light). Additionally, as described above, for embodiments of the invention, blocking surfaces, optical elements, or a combination of both, are employed to substantially reduce the light, from the light source assemblies, to an observer.

For one embodiment of the invention, the illumination of the wheel is accomplished with only a small amount of physical coverage of the wheel surface by the light source assemblies. Also, the light source assemblies including any light shielding and directing apparatus, have minimal outboard projection to avoid interference with other parts of the vehicle or other objects.

Various embodiments of the invention may include a light projector, as described above, to provide illumination at less oblique angles. The addition of such light projectors is particularly useful for wheels that are mildly concave or convex where various embodiments of the invention (e.g. rim illuminators as described above), only obliquely illuminate a central portion of the surface of the wheel. For one embodiment of the invention, a portion of light from one or more light source assemblies is coupled through a waveguide to corresponding light projectors. The light projectors direct the coupled portion of light to the surface of the wheel. For one such embodiment, the means of coupling the portion of light to the light projector is a micro-optic prism array sheet collimator layer.

Embodiments of the invention provide a means of illuminating a large number of wheel variations with a small number of illumination system designs. Effective illumination is provided for the vast majority of a wide variety of wheel designs and sizes using a small product set. It is important to be able to minimize the number of product variations to cover the wheel variations in order to reduce inventory, design and production costs.

Additionally, the wheel illumination provided by embodiments of the invention increase vehicle side visibility for safety reasons.

For various alternative embodiments of the invention, the wheel may be modified to allow for the easy attachment of the light source assemblies, including the attachment of the various structures on which the light source assemblies may be positioned.

For one embodiment of the invention, the wheel illuminator may also include additional light source assemblies for signaling. In contrast to the light source assemblies used for wheel illumination, the light from these additional light source assemblies is intentionally directed outward from the surface of the wheel. That is, the amount of light, from the additional light source assemblies, that is directed away from the wheel surface is greater than the amount light, from the additional light source assemblies, that is reflected from the surface of the wheel. For one such embodiment, the additional light source assemblies may be operated independently of the light source assemblies used for wheel illumination.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a light source; and
   a means for positioning the light source within a rotating reference frame of a wheel, the positioning means to allow light from the light source directed outside the wheel such that an amount of light from the light source incident upon and reflected from a visible surface of the wheel is greater than an amount of light from the light source directed away from the visible surface of the wheel.

2. The apparatus of claim 1 wherein the light source is selected from the group consisting of light-emitting diodes, filament-based light elements, gas-based light elements, lasers, and a combination thereof.

3. The apparatus of claim 1 wherein the light source is positioned on a portion of the wheel selected from the group consisting of a wheel rim, a rim flange, a wheel center cap, a disk, a hat, a spoke, and a combination thereof.

4. The apparatus of claim 3 wherein the visible surface of the wheel from which the light is reflected includes the surface of a structural element attached to the wheel.

5. The apparatus of claim 3 wherein the visible surface of the wheel from which the light is reflected includes the surface of a coating applied to the wheel.

6. The apparatus of claim 4 wherein the structural element attached to the wheel is a hubcap.

7. The apparatus of claim 1 wherein the light source is positioned on a structural element attached to the wheel.

8. The apparatus of claim 7 wherein the structural element attached to the wheel is a hubcap.

9. The apparatus of claim 1 wherein the positioning means comprises a shield that reduces the amount of light from the light source directed outside the wheel that is directed away from the visible surface of the wheel such that the amount of light from the light source that is incident upon and is reflected from the visible surface of the wheel is greater than the amount of light from the light source directed away from the visible surface of the wheel.

10. The apparatus of claim 9 wherein the shield has a reflective surface facing the light source such that a portion of a light reflected from the reflective surface is incident upon the wheel surface.

11. The apparatus of claim 1 further comprising a light projector attached to the positioning means, the light projector to direct a portion of light from the light source directed outside the wheel to the visible surface of the wheel such that the amount of light from the light source incident upon and reflected from the visible surface of the wheel is greater than the amount of light from the light source directed away from the visible surface of the wheel.

12. The apparatus of claim 1 further comprising an optical element attached to the positioning means, the optical element to direct a portion of light from the light source directed outside the wheel to the visible surface of the wheel such that the amount of light from the light source incident upon and reflected from the visible surface of the wheel is greater than the amount of light from the light source directed away from the visible surface of the wheel.

13. The apparatus of claim 1 wherein the positioning means comprises a structure attached to at least a portion of a rim of the wheel.

14. The apparatus of claim 13 wherein the structure is an annular ring attached to a rim of the wheel.

15. The apparatus of claim 1 wherein the positioning means comprises a crossbeam member.

16. The apparatus of claim 1 wherein the positioning means comprises a portion of the wheel.

17. The apparatus of claim 1 further comprising a waveguide attached to the positioning means, the waveguide to receive light from the light source directed outside the wheel and direct the light to the visible surface of the wheel such that the amount of light from the light source incident upon and reflected from the visible surface of the wheel is greater than the amount of light from the light source directed away from the visible surface of the wheel.

18. The apparatus of claim 17 wherein the waveguide comprises a micro-optic prism away sheet collimator layer.

19. The apparatus of claim 1 further comprising:
one or more additional light sources such that a total amount of light from the light source and the additional light sources directed away from the visible surface of the wheel is less than an amount of light incident upon and reflected from the visible surface of the wheel.

20. The apparatus of claim 1 further comprising a second light source operated independently of the light source.

21. The apparatus of claim 1 wherein the surface of the wheel is modified to change an angle of reflection of light from the light source such that light from the light source which would not be visible in a given observation region but for the modification of the surface of the wheel is visible in the given observation region.

22. The apparatus of claim 21, wherein modifying the surface of the wheel includes modifying by at least one of machining, bead blasting, chemical etching, applying a chemical coating, applying a decal and plating.

* * * * *